April 8, 1930.                H. STARK                    1,753,352
            HAND OR ANGLE PIECE FOR DENTAL PURPOSES
                      Filed April 25, 1929
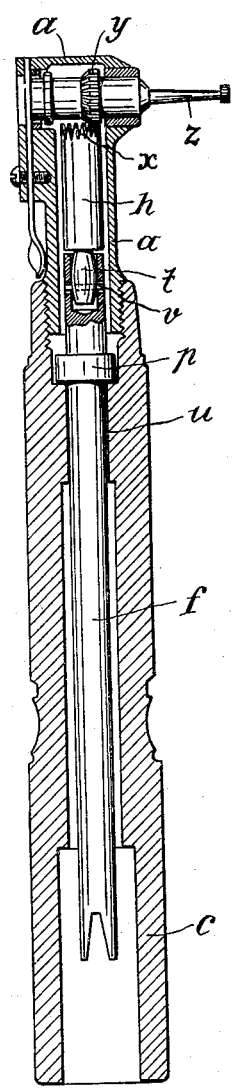
Inventor:
Hans Stark,
Att'y.

Patented Apr. 8, 1930

1,753,352

UNITED STATES PATENT OFFICE

HANS STARK, OF BERLIN-CHARLOTTENBURG, GERMANY, ASSIGNOR TO DEUTSCHE GOLD- UND SILBERSCHEIDEANSTALT VORMALS ROESSLER, OF FRANKFORT-ON-THE-MAIN, GERMANY

HAND OR ANGLE PIECE FOR DENTAL PURPOSES

Application filed April 25, 1929, Serial No. 358,041, and in Germany April 24, 1928.

The present invention relates to hand or angle pieces for dental purposes and has for a general object the provision of angle pieces in which the toothed gearing for driving the tool will automatically adjust itself to proper driving relation and will thus prevent jamming or operation under undue friction.

In hand pieces or angle pieces, and particularly those used for dental purposes, the clamping sleeve carrier which carries the clamping sleeve for clamping the shaft of the tool is generally driven by a shaft upon which toothed gearing is mounted, which gearing is necessarily of small dimensions. The diameter of a gear having from eight to twelve teeth varies in diameter from approximately 2–6 mm. In view of the fact that the shafts rotate at from 2,500 to 4,000 revolutions per minute it becomes necessary for the relative engagement of the gear members to be as accurate as possible inasmuch as the fine gear teeth will otherwise jam and thus be strained to such an extent that they are liable to break.

Hitherto the gear wheel of the hand piece shaft, usually referred to as the lower gear, was ordinarily rigidly connected to the main driving shaft or formed directly thereon. In another type of construction, the main drive shaft was connected to a supplemental or extension shaft which supplemental shaft carried the lower gear and was mounted against longitudinal or transverse movement. The objectionable characteristic of these known constructions is that the engagement of the teeth between the upper gear and the lower gear depends substantially on the accuracy of the mounting of the main drive shaft in the first instance, or substantially upon the mounting of the supplemental shaft in the second instance.

In the construction ordinarily used for dental grinding instruments and the like, the position of the shafts may be adjusted only within very narrow limits and it is frequently impossible to bring the separate gears into an ideal engagement while at the same time accurately guiding the main driving shaft or the supplemental shaft when the parts are assembled. Even in cases where proper interengagement of the parts has been obtained by tedious trial and adjustment of the relative positions of the parts in the course of manufacture, considerable difficulties are nevertheless met with when the instrument has to be taken apart for repairing or cleaning, for it is extremely difficult to reassemble the parts into their accurate relations as before. It is thus impossible for the dentist to perform this work himself and he therefore is obliged to frequently return the instrument, which for hygienic reasons must often be cleaned, to the factory.

These disadvantages are eliminated by the present invention in which the upper and lower gears are so mounted with respect to each other that one or the other or both are free to move transversely of their own axis in such a manner that they may adjust themselves freely while in operation.

The drawing shows a preferred form of construction in which the driven shaft carrying the upper gear is rotatably mounted in fixed bearings and in which the lower gear is carried by a supplemental shaft acting as a driving shaft which is connected to the main drive shaft by a flexible coupling and is free to tilt about the axis of the main drive shaft.

The main drive shaft $f$ is mounted in a bearing sleeve $c$ serving simultaneously as the handle. The portion $u$ of the member $c$ serves as a bearing for the main drive shaft which is provided with a shoulder $p$ to prevent it from falling out of the bearing sleeve. Interior threads are provided at the upper end of the bearing sleeve $c$ to receive the exterior threads on the lower end of extension $a'$ upon whose upper end the head $a$ is mounted, the members $c$, $a'$ and $a$ thus comprising a casing in which the tool driving mechanism is housed. The supplemental shaft $h$ having the crown gear $x$ which serves as the lower gear of the tool drive formed thereon is of smaller diameter than the bore through the extension $a'$ and is connected to the main drive shaft by means of a flexible coupling $t$, $v$. While any convenient form of flexible coupling may be used, that shown in the drawing is relatively simple and has been found to be very efficient. In this form the upper end of the main drive shaft is hollowed out to receive the convex member $t$ attached to the supplemental shaft. A pin $v$ passes through the member $t$, projecting on both sides thereof and engaging slots formed in the walls of the hollowed portion of the main drive shaft. Supplemental shaft $h$ will thus rotate with the main drive shaft but will also be free to tilt in any direction with respect to the main drive shaft. In operation, the crown gear $x$ engages the upper gear $y$ which acts to drive the tool $z$, the gear $x$ automatically adjusting itself with respect to gear $y$ by the tilting of the supplemental shaft with respect to the axis of the main drive shaft.

It may be surprising that in such a yielding arrangement of the parts it is possible to obtain precision as regards the engagement of the teeth and the mounting of the supplemental shaft but experiments have shown that the interengaging gears $x$ and $y$ during their rotation tend to adjust themselves relatively into a position most favorable for obtaining a frictionless operation. It is therefore possible to allow the proper engagement of the gears to take place automatically if, in accordance with the invention, at least one of them is mounted in such a manner that it can freely adjust itself relatively to the other. Thus it is possible to fit the main drive shaft $f$ accurately into its bearing $u$ without accurately considering its engagement with the upper gear $y$. A hand piece made in accordance with the present invention is therefore characterized by its absolutely noiseless operation and small consumption of power.

In spite of the fact that the present construction requires the provision of a flexible coupling, the costs of production are lower than the costs of producing similar devices in which the parts are fixedly mounted for a flexible coupling can be constructed at less expense than that incidental to the accurate, fine adjustment of the rigid parts.

Inasmuch as a construction made in accordance with the present invention is adapted to be readily taken apart and reassembled by the operator, this construction is particularly suited to be used in sets wherein separate parts of an angle piece can be interchanged with parts of angle pieces of other sizes and types and be combined so as to form angle pieces of various shapes and sizes in the manner disclosed, for example, in my copending application S. N. 255,025, filed Feb. 17, 1928. Better fits for the gears driving the tool would thus be insured in each of the various assemblies possible.

Having described my invention, what I now claim as new and desire to secure by Letters Patent of the United States is as follows:

1. In a hand piece or angle piece for clamping drilling and grinding tools, particularly for dental purposes, a driven shaft having a driven gear thereon, and a driving shaft having a driving gear meshing with the driven gear, one of said shafts being free to move transversely of its own axis whereby the driving gear and the driven gear will automatically adjust themselves to favorable relative positions upon rotation.

2. In a dental hand piece having a casing enclosing a driving mechanism adapted to drive a tool, a driven shaft having a driven gear thereon mounted within said casing, and a driving shaft having a driving gear meshing with the driven gear also mounted within said casing one of said shafts being spaced from the walls of the casing and being free to tilt about its own axis whereby the driving gear and the driven gear will automatically adjust themselves to favorable relative positions upon rotation.

3. In an angle piece for dental purposes having a casing enclosing a driving mechanism adapted to drive a tool, a driven shaft having a driven gear thereon mounted in fixed bearings within said casing, and a driving shaft having a driving gear meshing with said driven gear also mounted within said casing, said driving shaft being free to tilt about its axis within said casing whereby the driving gear will automatically adjust its position with respect to the driven gear upon rotation.

4. In an angle piece for dental purposes having a casing enclosing a driving mechanism adapted to drive a tool, a driven shaft having a driven gear thereon mounted in fixed bearings within said casing, and a driving shaft having a driving gear meshing with said driven gear also mounted within said casing substantially at right angles to the driven shaft, said driving shaft and driving gear being spaced from the walls of the casing and being free to tilt about its axis whereby the driving gear will automatically adjust its position with respect to the driven gear upon rotation.

5. In an angle piece for dental purposes having a casing enclosing a driving mechanism adapted to drive a tool, a main drive shaft mounted in fixed bearings within said casing, a driven shaft having a driven gear thereon also mounted in fixed bearings within said casing, a supplemental driving shaft having a driving gear engaging the driven gear, and a flexible coupling connecting the main drive shaft with the supplemental driving shaft, said supplemental driving shaft and driving gear being spaced from the walls of the casing so as to be free to tilt about its axis of rotation whereby the driving gear will automatically adjust its position with respect to the driven gear upon rotation.

6. A structure as claimed in claim 5 in which the diameters of the driving gear, supplemental shaft and flexible coupling, are equal to or less than the diameter of the main driving shaft.

7. In an angle piece for dental purposes having a casing enclosing a driving mechanism adapted to drive a tool, a main drive shaft mounted in fixed bearings within said casing, said main drive shaft being provided with an axial recess at one end and having slots in the walls formed by said recess, a driven shaft having a driven gear thereon also mounted in fixed bearings within said casing, a supplemental driving shaft having a crown gear formed at one end thereof for engaging the driven gear and having a ball shaped member at its other end extending into the recess of said main drive shaft, and a pin extending through said ball shaped member and engaging the slots in the walls formed by the recess in the main drive shaft, the supplemental driving shaft and its crown gear being spaced from the walls of the casing so as to be free to tilt about its axis of rotation whereby the crown gear will automatically adjust its position with respect to the driven gear upon rotation.

In testimony whereof I affix my signature.

HANS STARK.